April 5, 1932.  C. V. JOHNSON  1,852,116
AIRPLANE
Filed Nov. 7, 1930

INVENTOR.
Carl V. Johnson,
BY
ATTORNEY

Patented Apr. 5, 1932

1,852,116

UNITED STATES PATENT OFFICE

CARL V. JOHNSON, OF SOUTH BEND, INDIANA, ASSIGNOR TO BENDIX RESEARCH CORPORATION, OF SOUTH BEND, INDIANA, A CORPORATION OF INDIANA

AIRPLANE

Application filed November 7, 1930. Serial No. 494,001.

This invention relates to airplanes and other vehicles, and is illustrated as embodied in a novel airplane landing and running gear. An object of the invention is to store power, derived from the absorption of the landing or other shocks, to be used in operating by separate power mechanisms such as brakes.

In the illustrated arrangement, there is a hydraulic or other fluid shock absorber or oleo device, which takes the shock of landing, and from which fluid under pressure is taken and trapped, for example in an auxiliary reservoir. Preferably there is an automatic control valve, or some similar device, for limiting the pressure in the reservoir, and of course usually there is a valve controlled by the pilot and which causes the operation of the brake or its equivalent by the pressure fluid.

Figure 1:
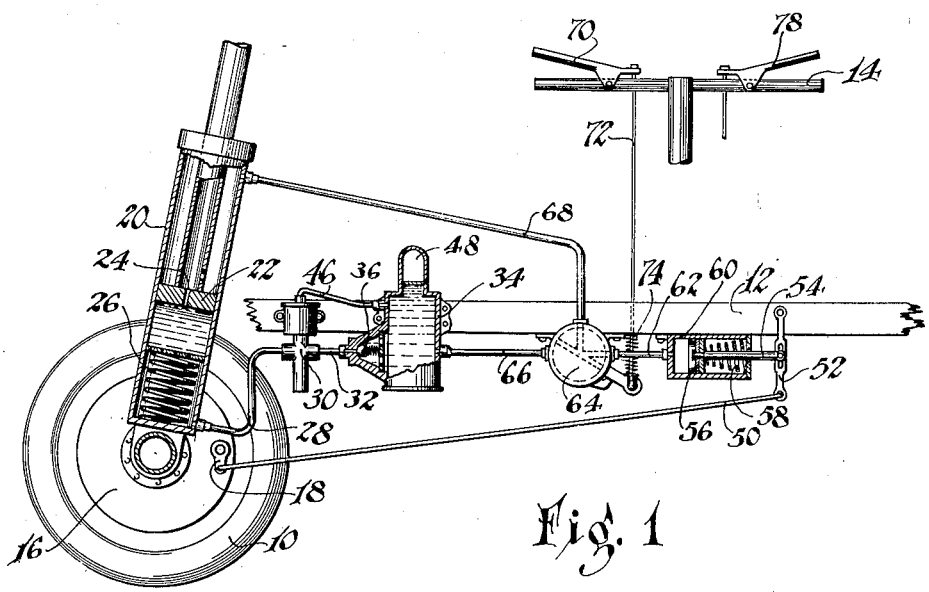
Figure 2:
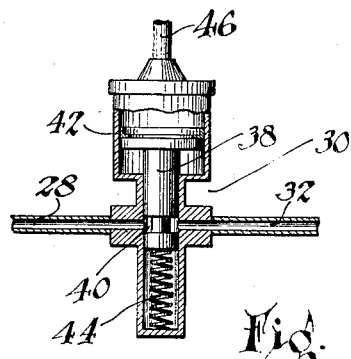

The above and other objects and features of the invention, including various novel and desirable details of construction, will be apparent from the following description of the illustrative embodiment shown in the accompanying drawings, in which:

Figure 1 is a diagrammatic longitudinal section through an airplane landing and running gear, showing the parts associated with one wheel; and Figure 2 is a section through the novel automatic control valve.

In the diagrammatic illustration, one of the landing wheels is shown at 10, and part of the fuselage at 12; the usual pivoted rudder bar is indicated at 14. The wheel is provided with a brake 16 operated by means such as a camshaft lever 18.

The shock of landing is absorbed by a suitable oleo gear on shock strut, shown as including a cylinder 20 connected to the wheel axle and containing a piston 22 connected to the fuselage. The cylinder contains oil or other fluid, and the piston is formed with a restricted opening 24 through which the fluid is forced in landing in the usual manner, thereby absorbing and dissipating as heat the kinetic energy of the plane, when landing on the ground. In the bottom of the cylinder there may be a spring 26 yieldingly supporting the load when taxiing on the ground.

The bottom of the cylinder 20 is connected by means such as a conduit 28 with automatic pressure-control means such a valve 30, which in turn is connected by means such as a conduit 32 with a storage reservoir 34, into which it empties through an inwardly-opening spring-pressed ball check valve 36.

The automatic valve 30 includes a double-diameter cylinder, in which is arranged a double-diameter piston 38 having a cross passage, such as a groove 40 around its smaller diameter portion which registers with the conduits 28 and 32 when the piston is held in its upper position, for example by being held against a stop 42 by a strong spring 44 compressed between the bottom of the piston and the smaller-diameter head of the cylinder. The top of the cylinder is connected by means such as a conduit 46 with the reservoir 34, so that the top of the piston 38 is subject to the pressure in the reservoir.

It will be seen that, in landing, fluid under pressure is forced into the reservoir 34, past check valve 36, compressing air in the upper part of the reservoir (mainly in a dome 48). When the pressure rises to a predetermined maximum determined by the relative diameters of the two piston parts, and by the strength of the spring 44, the piston is forced downwardly to cut off communication between the conduits 28 and 32 until the pressure drops again.

It is an important object of the present invention to utilize power derived from the shock of landing, and stored for example as described above, for the operation of a separate mechanism such as the brake 16. In the arrangement illustrated, the brake camshaft lever 18 is connected, by means such as a cable 50, with a lever 52 shown fulcrumed on the fuselage 12. Lever 52 may be slotted to be operatively connected by a suitable pivot pin to the end of a piston rod 54 operated by a piston 56 acting against the resistance of a return spring 58 in a cylinder 60.

The cylinder 60 is shown as communicating through a conduit 62 with a three-way valve 64, which is connected by an intake conduit 66 with the reservoir 34 and by an exhaust conduit 68 with the top of the shock-absorber cylinder 20. The valve 64, in the position shown (the "off" or brake-released position) places conduits 62 and 68 in communication with each other, so that there is no pressure on the brake, and so that excess operating fluid is returned to the shock-absorber.

In operation, depression of a pedal or hand lever 70, preferably mounted on the end of the rudder bar 14 which corresponds with the particular brake shown (i. e. right or left, as the case may be), operates means such as a tension cable 72 to rock the valve 64 against the resistance of a return valve spring 74. This places the conduit 62 in communication with the conduit 66, whereupon the pressure fluid in the reservoir 34 acts on the piston 56 to apply the brake. Release of the lever 70 allows spring 74 to return the valve to the position shown in the drawing, releasing the brake.

It will be understood that there is a valve lever 78 on the other end of the rudder bar also, operating a similar set of mechanisms for controlling and operating the brake on the other wheel. Thus both brakes may be applied at once, to retard movement on the ground, or either brake may be applied alone, to steer the airplane when on the ground.

While one illustrative embodiment has been described in detail, it is not my intention to limit the scope of the invention to that particular embodiment, or otherwise than by the terms of the appended claims.

I claim:

1. Vehicle running gear, for an airplane or the like, comprising a fluid device for taking the landing shock, a power reservoir filled with fluid under pressure from said device when landing, a separate mechanism operated by the fluid in said reservoir, valve means for controlling the operation of said latter mechanism, connections between said valve and reservoir and other connections between said valve and fluid device and manually operable means for operating said valve.

2. Vehicle running gear, for an airplane or the like, comprising means for absorbing the shock of landing a device for storing power derived from the shock of landing through the medium of said means, a separate mechanism such as a brake, a control device for limiting the power stored in said power-storing device, and means controlled by the pilot and causing the operation of said mechanism by the power stored in the power-storing device, said latter means being connected, by fluid transmitting connections, with said brake mechanism, said shock absorbing means and said power storing device.

3. Vehicle running gear, for an airplane or the like, comprising fluid means for absorbing the shock of landing a reservoir for storing fluid placed under pressure by the shock of landing through the medium of said fluid means, a separate mechanism such as a brake, a control valve for limiting the pressure in said reservoir, and a valve controlled by the pilot and causing the operation of said mechanism by the fluid stored under pressure in the reservoir, said valve being connected, by fluid transmitting connections, with said brake mechanism, said shock absorbing means and said power storing device.

In testimony whereof, I have hereunto signed my name.

CARL V. JOHNSON.